(12) United States Patent  
Hirata et al.

(10) Patent No.: US 7,221,507 B2  
(45) Date of Patent: *May 22, 2007

(54) PROJECTION-TYPE PICTURE DISPLAY APPARATUS AND SCREEN USED THEREBY

(75) Inventors: Koji Hirata, Yokohama (JP); Shigeru Inaoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/325,521

(22) Filed: Jan. 5, 2006

(65) Prior Publication Data

US 2006/0114559 A1    Jun. 1, 2006

Related U.S. Application Data

(63) Continuation of application No. 10/827,338, filed on Apr. 20, 2004, now Pat. No. 7,023,616, which is a continuation of application No. 09/412,578, filed on Oct. 5, 1999, now Pat. No. 6,728,031.

(30) Foreign Application Priority Data

Oct. 5, 1998    (JP)    ................................ 10-282261

(51) Int. Cl.  
G03B 21/56    (2006.01)

(52) U.S. Cl. ....................................... 359/457; 359/460

(58) Field of Classification Search ................ 359/452, 359/453, 455, 456, 457, 460  
See application file for complete search history.

(56) References Cited

U.S. PATENT DOCUMENTS 4,988,164 A    1/1991    Ichikawa 5,066,099 A *  11/1991   Yoshida et al. ............. 359/457

(Continued)

FOREIGN PATENT DOCUMENTS

JP    2-097991    4/1990

(Continued)

OTHER PUBLICATIONS

"Hi-Vision Rear Projector Using LDC Panels" by Minori Yokozawa, pp. 46-56, NHK Technology Research R & D, and English translation of "3.5 Screen".

(Continued)

*Primary Examiner*—Christopher Mahoney  
(74) *Attorney, Agent, or Firm*—Antonelli, Terry, Stout & Kraus, LLP.

(57)    ABSTRACT

A screen for use in a projection-type image display apparatus having an image displaying element which includes a plurality of pixels for modulating light from a light source so as to form an enlarged picture on the screen. The screen includes a Fresnel lens sheet having Fresnel lenses on a light emission side, a first sheet disposed on the light emission side of the Fresnel lens sheet, and a second sheet disposed on a light emission side of the first sheet and adhered thereto. The first sheet includes a plurality of lenticular lenses formed on a light incident side which extend in a longitudinal direction and are arranged in a horizontal direction, with light passing window portions being formed at positions opposing the lenticular lenses and with light absorbing portions provided therebetween. The second sheet includes a light scattering element therein.

25 Claims, 8 Drawing Sheets

U.S. PATENT DOCUMENTS

| | | | |
|---|---|---|---|
| 5,485,308 A | 1/1996 | Hirata et al. | |
| 5,611,611 A | 3/1997 | Ogino | |
| 5,615,045 A | 3/1997 | Takuma et al. | |
| 5,724,182 A * | 3/1998 | Mitani et al. | 359/457 |
| 5,745,288 A | 4/1998 | Miyata | |
| 5,804,102 A | 9/1998 | Oi et al. | |
| 5,815,313 A | 9/1998 | Mitani et al. | |
| 5,870,224 A | 2/1999 | Saitoh et al. | |
| 6,046,846 A | 4/2000 | Van De Ven | |
| 6,061,178 A | 5/2000 | Park | |
| 6,113,251 A | 9/2000 | Miyata | |
| 6,158,038 A | 12/2000 | Yamaguchi et al. | |
| 6,249,376 B1 * | 6/2001 | Goto | 359/457 |
| 6,271,965 B1 * | 8/2001 | Miyata | 359/457 |
| 6,307,675 B1 | 10/2001 | Abe et al. | |
| 6,728,031 B2 | 4/2004 | Hirata | |
| 7,023,616 B2 * | 4/2006 | Hirata et al. | 359/457 |
| 2002/0048082 A1 | 4/2002 | Kobayashi | |

FOREIGN PATENT DOCUMENTS

| | | |
|---|---|---|
| JP | 2-213825 | 8/1990 |
| JP | 3-072972 | 3/1991 |
| JP | 3-37437 | 4/1991 |
| JP | 3-168630 | 7/1991 |
| JP | 5-63781 | 3/1993 |
| JP | 6-003747 | 1/1994 |
| JP | 7-117818 | 5/1995 |
| JP | 7-128743 | 5/1995 |
| JP | 08-036224 | 2/1996 |
| JP | 8-62728 | 3/1996 |
| JP | 9-274448 | 10/1997 |
| JP | 10-083029 | 3/1998 |
| JP | 10-160911 | 6/1998 |
| JP | 10-239777 | 9/1998 |

OTHER PUBLICATIONS

"Trikeps White Series, No. 136, New Edition, Liquid Crystal Video Projector Technology" edited by Tadashi Sasaki, Shinji Morozumi; "Chapter 5, Development of Screen (Rear-Type)" pp. 113-130, and "Section 4 Designing of Optic System" pp. 141-170, and English translation of 1.2 Double-Sheet Type Screen".

* cited by examiner

PROJECTION-TYPE PICTURE DISPLAY APPARATUS AND SCREEN USED THEREBY

CROSS REFERENCE TO RELATED APPLICATION

This is a continuation of U.S. application Ser. No. 10/827,338, filed Apr. 20, 2004, now U.S. Pat. No. 7,023,616, which is a continuation of U.S. application Ser. No. 09/412,578, filed Oct. 5, 1999, now U.S. Pat. No. 6,728,031, the subject matter of which is incorporated by reference herein.

BACKGROUND OF THE INVENTION

1. Field of the Invention

In general, the present invention relates to a projection-type picture display apparatus such as a projection television set and a screen used thereby. More particularly, the present invention relates to a projection-type picture display apparatus which has a small amount of inadvertent inclusion of external light, is capable of suppressing a reduction in contrast and capable of lowering the degree of deterioration of a picture quality by using an optical device having a structure comprising pixels laid out to form a matrix such as a liquid-crystal panel or a DMD (Digital Micromirror Device) as a picture generating source, and relates to a screen used by the projection-type picture display apparatus.

2. Description of the Related Art

With the picture source going diverse, the projection-type picture display apparatus is enjoying broad general popularity in the market by virtue of its marketability factors of a projection-type optical apparatus with a large screen such as a small weight, a low cost and a small size. On the other hand, in recent years, a projection-type picture display apparatus using a liquid-crystal panel as a picture generating source starts its participation in the market due to substantial improvement of the precision/fineness and the numerical aperture of the liquid-crystal panel. This projection-type picture display apparatus is designed into a configuration wherein a source picture displayed on the liquid-crystal panel is displayed as an enlarged picture on a screen in full colors by a projection lens unit.

In an optical system employed in this projection-type picture display apparatus, it is possible to adopt a three-panel technique employing three liquid-crystal panels as shown in FIG. 19 of Japanese Unexamined Patent Publication No. Hei 9-96759, or a single-panel technique employing only one liquid-crystal panel as shown in FIG. 1 of Japanese Unexamined Patent Publication No. Hei 4-60538. First of all, an optical system adopting a single-panel technique employing one liquid-crystal panel is explained by referring to FIG. 1.

FIG. 1 is a top-view diagram showing a partial cross section of a layout of a projection-type optical system adopting a single-panel technique employing one liquid-crystal panel.

As shown in the figure, a reflective mirror 29 directs a beam emitted by a white-color light source 28 implemented by a metal halide lamp, a canon lamp, a halogen lamp or a high-pressure mercury lamp to a converging lens 27 with a high degree of efficiency whereas a collimator lens 26 converts the beam into all but parallel white-color lights. Three dichroic mirrors 23, 24 and 25 with types different from each other are placed in front of the collimator lens 26. The dichroic mirrors 23, 24 and 25 exhibit characteristics to selectively reflect lights with the green, red and blue wavelengths respectively but to pass on other components. Symbols R, G and B in the figure denote respectively the red, green and blue lights split by the dichroic mirrors 24, 23 and 25. In this conventional configuration, the red-color light is taken as a reference while the blue-color and green-color lights are radiated to a liquid-crystal panel 22 from slanting directions relative to the red-color light.

The liquid-crystal panel 22 comprises pixels for the 3 primary colors, namely, red, green and blue. The pixels each exhibit an optical transmittivity representing the level of a luminance component of a picture signal. Thus, the red, green and blue lights are modulated in accordance with the level of the picture signal to create a desired image on the liquid-crystal panel 22. The image displayed on the liquid-crystal panel 22 is then projected by a projection-lens unit 21 on a screen 20 as an enlarged picture.

In order to radiate an image light emitted by the liquid-crystal panel 22 to the projection-lens unit 21 with a high degree of efficiency, an optical system including a convex lens for converging a light is typically provided between the liquid-crystal panel 22 and the projection-lens unit 21. It should be noted that such an optical system is not shown in FIG. 1.

The white-color light source 28 itself dissipates heat which can be a cause of a damage. On the other hand, the liquid-crystal panel 22 including a polarizing plate absorbs an incident light, dissipating heat which can also be a cause of a damage. In order to reduce an increase in temperature, a cooling fan not shown in the figure is used to forcibly cool the white-color light source 28 and the liquid-crystal panel 22 so that they can be used at a temperature in a desired range.

Next, the optical system adopting the conventional three-panel technique, that is, employing three liquid-crystal panels, is explained by referring to FIG. 2.

FIG. 2 is a top-view diagram showing a partial cross section of a layout of a projection-type optical system adopting the conventional three-panel technique employing three liquid-crystal panels. Configuration components shown in the figure identical with those of the optical system shown in FIG. 1 are denoted by the same reference numerals as those of the latter. The optical system shown in FIG. 2 has a configuration wherein a reflective mirror 29 collimates a beam emitted by a white-color light source 28 implemented by a metal halide lamp, a canon lamp, a halogen lamp or a high-pressure mercury lamp into all but parallel white-color lights. Two dichroic mirrors 31 and 32 with types different from each other are placed in front of the reflective lens 29. The dichroic mirrors 31 and 32 split the beam into color components which are then radiated to their respective liquid-crystal panels 33, 34 and 35. Pictures displayed on the liquid-crystal panels 33, 34 and 35 are synthesized by a color synthesizing prism 36 before being projected by a projection-lens unit 21 on a screen 20 as an enlarged picture. Since the operation of the projection-type optical system adopting the conventional three-panel technique employing the three liquid-crystal panels is the same as the conventional system shown in FIG. 1, it is not necessary to repeat its explanation.

In addition, a forced cooling system of the white-color light source 28 and the liquid-crystal panels each including a polarizing plate is the same as the optical system shown in FIG. 1. Furthermore, a radiation system to increase the efficiency of light utilization has become popular in recent years. The radiation system has a polarized-light synthesizing function for synthesizing P and S polarized lights generated by a polarization beam splitter as a result of splitting of a light emitted by the light source.

A rear-projection-type picture display apparatus employing the optical systems explained above is described by referring to FIGS. 3 and 4.

FIGS. 3 and 4 are each a side-view diagram showing a partial cross section of main components of the rear-projection-type picture display apparatus employing the projection-type optical system. In the figures, reference numerals 11 and 12 denote a radiation system including a light source and a projection lens respectively. Reference numeral 13 denotes an optical-path reflection mirror and reference numeral 14 denotes a screen. Reference numeral 15 denotes a case. The length of an optical path from the projection lens 12 to the screen 14 in the rear-projection-type picture display apparatus shown in FIG. 3 is equal to that of the apparatus shown in FIG. 4. Since the rear-projection-type picture display apparatus shown in FIG. 3 has a comparatively big depth, its height can be made relatively small. Since the rear-projection-type picture display apparatus shown in FIG. 4 has a comparatively big height, on the other hand, its depth can be made relatively small. In either of the rear-projection-type picture display apparatuses, by shortening the projection distance of the projection lens 12, that is, the length of the optical path from the projection lens 12 to the screen 14, a compact set can be implemented by employing only one optical-path reflection mirror 13. As the screen 14, a screen 40 having a two-sheet structure is normally employed. The screen 40 comprising a lenticular lens sheet and a Fresnel lens sheet is used in a projection-type picture display apparatus employing a Braun tube 43 shown in FIG. 10.

FIG. 10 is a side-view diagram showing a partial cross section of main components of the rear-projection-type picture display apparatus employing the projection-type Braun tube 43. It should be noted that, in the figure, reference numerals 40 and 41 denote a screen and a projection lens respectively whereas reference numerals 42 and 43 denote a bracket and a projection-type Braun tube respectively. Reference numeral 44 denotes an optical path of a light projected from the projection-type Braun tube 43 to the screen 40 provided at the end of a radiation path.

A detailed configuration of the screen 40 shown in FIG. 10 is shown in FIGS. 12 and 13.

FIGS. 12 and 13 are each a diagram showing a squint view of main components of the conventional screen 40. Components of FIG. 12 identical with those shown in FIG. 13 are denoted by the same reference numerals as the latter. The screen 40 shown in FIG. 12 comprises a Fresnel lens sheet 51a and a lenticular lens sheet 52. On the other hand, the screen 40 shown in FIG. 13 comprises a Fresnel lens sheet 51b and a lenticular lens sheet 52. The lenticular lens sheet 52 comprises a lenticular lens 54 on the incidence surface, a lenticular sheet 56 on the emission surface and a light absorbing layer 57 provided on a protrusion 55. The Fresnel sheet 51a has a flat incidence surface and a Fresnel lens 53 on the emission surface thereof. On the other hand, the Fresnel sheet 51b comprises a lenticular lens 58 provided on the incidence surface thereof and a Fresnel lens 53 provided on the emission surface thereof. As described above, the screen 40 shown in FIG. 12 is different from that shown in FIG. 13 in that, in the case of the former, no lenticular lens 58 is provided on the image-light incidence surface of the Fresnel sheet 51 while, in the case of the latter, the lenticular lens 58 is provided. It should be noted that the lenticular lens 58 has its longitudinal direction coinciding with the horizontal direction of the screen 40.

In a screen having a two-layer structure comprising a lenticular lens sheet 52 and a Fresnel lens sheet 51 used in a rear-projection-type picture display apparatus employing the conventional projection-type Braun tube, the horizontal-direction width of the screen of the light absorbing layer 57 provided on the picture-viewing side of the lenticular lens sheet 52 can be made larger than the width of the lenticular lens 56 on the emission surface. That is, if the width of the lenticular lens 56 on the emission surface is made small, the efficiency of the light utilization decreases. Thus, the width of the light absorbing layer 57 in the screen horizontal direction can not be made large. For this reason, there exists a phenomenon in which an external light is reflected to the lenticular lens 56 provided on the emission surface. This phenomenon raises a first problem that remains to be solved. The problem is that the inadvertent inclusion of an external light can not be reduced to a value below a predetermined amount and the degree of contrast deterioration can not be suppressed below a predetermined level.

The following description explains in detail reasons why the first problem arises.

FIG. 11 is a diagram showing a top view of a layout of the rear-projection-type picture display apparatus employing the conventional projection-type Braun tube on a horizontal plane in a simple and plain manner. As described above, the rear-projection-type picture display apparatus employs the conventional projection-type Braun tube in the horizontal-plane layout.

In FIG. 11, reference numerals 7R, 7G and 7B denote red, green and blue projection-type Braun tubes respectively whereas reference numerals 8R, 8G and 8B denote projection lens associated with the red, green and blue projection-type Braun tubes 7R, 7G and 7B respectively. Reference numerals 10R, 10G and 10B denote red, green and blue projected beams respectively. In the optical system of the rear-projection-type picture display apparatus, in actuality, there are reflective mirrors for reflecting the red, green and blue projected beams 10R, 10G and 10B. These reflective mirrors are omitted from FIG. 11. Reference numerals 13R, 13G and 13B denote optical axes of the projection lenses 8R, 8G and 8B respectively. The optical axes 13R, 13G and 13B cross each other, forming optical-axis convergence angles θ at a point S0 in close proximity to the screen 40.

As shown in FIG. 11, the projected beams 10R, 10G and 10B are each spreading before hitting the screen 40. Pay attention to a specific projected beam, that is, the red projected beam 10R for example. Lights of the red projected beam 10R emanating from the projection lens 8R toward pixels on the screen 40 are not parallel. Instead, those lights are becoming more distant from the main light hitting the center pixel on the screen 40 or the optical axis 13R.

A light hitting a pixel on the screen 40 in the same direction as the main light hitting the center pixel has the highest intensity among the lights reaching the pixels on the screen 40. That is, the direction of the main light is a direction of the highest intensity. Thus, to a viewer at a fixed position, only a portion of the picture is bright while surrounding portions are dark. This phenomenon is referred to as a color shift. In order to reduce the effect of the color shift, in the screen 40 shown in FIG. 12 or 13, a spread picture beam arriving at the incidence surface of the Fresnel lens sheet 51 is converted into an almost parallel beam passing through the Fresnel lens 53 and leaving for the lenticular lens sheet 52 for each of the red, green and blue colors.

FIGS. 14 and 15 are each a diagram showing a partial enlarged cross section of the lenticular lens cut in a direction A-A1 shown in FIG. 13.

In these figures, reference numeral 54 denotes the lenticular lens provided on the surface of incidence of the picture light and reference numeral 56 denotes the lenticular lens provided on the surface of emission of the picture light.

According to a conventional technology disclosed in Japanese Unexamined Patent Publication No. Sho 58-59436, the lenticular lens 54 provided on the incidence surface has a surface resembling a portion of the surface of an elliptical cylinder. The direction of the major axis of the ellipse coincides with the direction of a thickness between the incidence surface 54 and the emission surface 56 which is indicated by notation 1-1' in FIGS. 14 and 15. One of the two foci of the ellipse is placed at an inner portion in close proximity to the lenticular lens 54 provided on the incidence surface. The other focus is placed at a position in close proximity to the lenticular lens 56 provided on the emission surface. The eccentricity e of the ellipse is set at a value approximately equal to the reciprocal of the refractive index n of the material of the lenticular lens sheet 52.

In such a configuration, all incident lights arriving at the lenticular lens 54 provided on the incidence surface in a direction parallel to the major axis of the ellipse are converged on the focus in close proximity to the lenticular lens 56 provided on the emission surface and spread in screen surface horizontal directions from this focus.

As for the lenticular lens 56 provided on the emission surface, the shape of the emission surface resembles the surface of an elliptical cylinder all but similar to the surface of an elliptical cylinder on the incidence-surface side. For an incident beam 60 at an edge shown in FIG. 14, the lenticular lens 56 provided on the emission surface functions to make the directional characteristic of the emitted light all but symmetrical with respect to the optical axis indicated by notation 1-1' in the figure. Furthermore, for an incident beam 62 coming from a slanting direction of the red or blue color as shown in FIG. 15, the lenticular lens 56 provided on the emission surface has a correcting function to make the directional characteristic of the emitted light all but symmetrical with respect to the optical axis indicated by notation 1-1' in the figure. In addition, the beam is not converged at a point due to frame aberration occurring at a location in close proximity to the emission surface at that time. Instead, the beam is spread in screen horizontal directions.

Inside the actual lenticular lens sheet 52, a scattering material 58 such as glass bead exists as shown in FIGS. 12 and 13, causing the beam to be actually further spread. Basically, however, the width of the light absorbing layer 57 in the screen horizontal direction can not be increased to a value greater than the width of the lenticular lens 56 provided on the emission surface. As a result, the quantity of light reflected due to inadvertent inclusion of an external light can not be reduced and a decrease in contrast can not be made lower than a predetermined value.

In addition, an incident beam 62 coming from the red or blue slanting direction is not converged at a point due to frame aberration occurring at a location in close proximity to the emission surface. Instead, the beam is spread in screen horizontal directions as described above. As a result, the width of the surface of the lenticular-lens surface can not be reduced. Thus, in the case of the lenticular lens sheet 52 adopting the conventional technique employing the lenticular lenses 54 and 56 on both the incidence and emission surfaces, there is raised a second problem that the lenticular-lens pitch in the screen horizontal direction can not be reduced to a value smaller than 0.5 mm.

For the reason described above, the total focus performance (horizontal resolution) of the rear-projection-type picture display apparatus is determined mainly by the lens pitch of the lenticular lens 52 which has a performance inferior to that exhibited by the projection-type Braun tube and the projection lens.

In addition, since the pitch of the lenticular lens 56 provided on the emission lens can not be reduced, a third problem is raised. To put it in detail, when an optical device having a structure comprising pixels laid out to form a matrix such as a liquid-crystal panel or a DMD (Digital Micromirror Device) is used as a picture generating source, the quality of a picture deteriorates due to moires generated on the entire screen 40. The generation of such moires is attributed to three causes, namely, projected and enlarged pixels on the screen 40, the lenticular lenses 54 and 56 provided on the lenticular lens sheet 52 and the Fresnel lens 53.

SUMMARY OF THE INVENTION

It is an object of the present invention addressing the problems encountered in the conventional technology described above to provide a screen and a projection-type display apparatus capable of reducing inadvertent inclusion of an external light and reducing a decrease in contrast when producing a projected and enlarged picture on the screen by using a projection lens from an image created by a picture generating source implemented by an optical device such as a liquid-crystal panel and a DMD (Digital Micromirror Device) with a structure comprising pixels laid out to form a matrix.

It is another object of the present invention addressing the problems encountered in the conventional technology described above to provide a screen and a projection-type display apparatus capable of reducing a decrease in picture quality caused by moires when producing a projected and enlarged picture on the screen by using a projection lens from an image created by a picture generating source implemented by an optical device such as a liquid-crystal panel and a DMD (Digital Micromirror Device) with a structure comprising pixels laid out to form a matrix.

An optical system of the projection-type picture display apparatus provided by the present invention employs an optical device such as a liquid-crystal panel and a DMD (Digital Micromirror Device) with a structure comprising pixels laid out to form a matrix as a picture generating source besides one projection lens shown in FIGS. 1 and 2. For this reason, since red and blue image lights are not radiated in slanting directions with respect to the green image light, no frame aberration is generated on the screen.

As a result, since the width of a lenticular lens provided on the image-light emission surface of a lenticular sheet can be reduced while the width of a light absorbing layer can be increased to a relatively large value, it is possible to reduce inadvertent inclusion of an external light and reduce a decrease in contrast.

A lens of provided on the incidence surface of the lenticular lens sheet is designed into a shape resembling the surface of an elliptical cylinder or a portion of a high-order non-spherical cylinder. When designed into the surface of an elliptical cylinder, the direction of the major axis of the ellipse coincides with the direction of the thickness between the incidence and emission surfaces. In addition, one of the two foci of the ellipse is placed at a position in close proximity to a lenticular lens provided on the incidence surface whereas the other focus is placed at a position in close proximity to a lenticular lens provided on the emission surface. In this case, the eccentricity e of the ellipse is set at a value approximately equal to the reciprocal of the refractive index n of the material of the lenticular lens.

In such a configuration, incident lights hitting the lenticular lens on the incidence surface in a direction parallel to the major axis of the ellipse are all converged on the focus in close proximity to the emission surface and then spread from this focus in screen surface horizontal directions. For this reason, the width in the screen horizontal direction of the lenticular lens provided on the emission surface can be reduced. In this case, the lens provided on the incidence surface of the lenticular lens sheet can be designed into a shape of a high-order non-spherical surface in order to further increase the efficiency of the light convergence.

Because of the reasons described above, since the-screen-horizontal-direction width of the lenticular lens provided on the emission surface can be reduced, the lens pitch of the lenticular lens can also be reduced as well. As a result, the total focus performance (horizontal resolution) of the rear-projection-type picture display apparatus using this screen can be improved.

In addition, in the screen provided by the present invention, the lens pitch of the lenticular lens can also be reduced as described above. Thus, even if the screen provided by the present invention is used in the projection-type picture display apparatus employing an optical device having a structure comprising pixels laid out to form a matrix such as a liquid-crystal panel or a DMD (Digital Micromirror Device) as a picture generating source, moires generated on the entire screen due to three causes are no longer striking. As described above, the three causes are projected and enlarged pixels on the screen, the lenticular lenses provided on the lenticular lens sheet and the Fresnel lens.

The objects of the present invention can be achieved as follows. According to a first aspect of the present invention, there is provided a screen characterized in that, in order to allow a light generated by a light source and modulated by a picture display device comprising pixels laid out to form a matrix to produce an image thereon to be projected by using a projection optical means on the screen as an enlarged picture, the screen is provided with: a Fresnel lens sheet placed on an emission side of the picture display device; a first configuration element having: lenticular lenses provided on an incidence side of a light passing through the Fresnel lens sheet; and light absorbing layers each provided at a place in close proximity to the focal point of one of the lenticular lenses and are separated from each other by a predetermined distance for forming the light passing unit; and a second configuration element having a light passing plate fixed on the emission side of the first configuration element and a pitch of the light passing units is made smaller than a pitch of pixels projected and enlarged on the screen from the image produced by the picture display device.

In the screen according to first aspect of the present invention, an emission surface of the light passing plate is subjected to a reflection preventing process for preventing reflection of a visible light. As an alternative, on the emission side of the light passing plate, there can also be provided a reflection preventing film for preventing reflection of a visible light.

In the screen according to the first aspect of the present invention, a light scattering material is mixed inside the light passing plate. As an alternative, a light scattering layer can also be provided between the light passing plate and the first configuration element.

In a screen according to the first aspect of the present invention, Fresnel lenses of the Fresnel lens sheet are laid out at a pitch Fp; the light passing units are laid out in a horizontal direction of the screen at a pitch Lp; and a ratio Lp/Fp of the pitch Lp to the pitch Fp is set at a value in the range 1.588 to 1.649.

According to a second aspect of the present invention, there is provided a screen for projecting an enlarged picture on the screen from a displayed picture output by a picture display apparatus comprising: a light source; a picture display device implemented as a matrix of pixels each having a means for modulating the intensity of a light generated by the light source; and a projection optical means for projecting the displayed picture appearing on the picture display device. The screen is provided with: a first configuration element having a plurality of lenticular lenses provided on a light-emission side of the projection optical means and light absorbing layers provided on a light-emission side of the first configuration element, and a light passing second configuration element provided on the light-emission side of the first configuration element. The lenticular lenses have a longitudinal direction coinciding with a screen surface vertical direction and are laid out contiguously in a screen surface horizontal direction; the light absorbing layers are sandwiched by boundaries of any two adjacent openings each provided at a location in close proximity to a focal point of one of the lenticular lenses associated with the opening; the first and second configuration elements are bound or stuck to each other; a pitch of the openings is made smaller than a pitch of pixels projected and enlarged on the screen from the displayed picture output by the picture display device; and a pitch of interference lines caused by both interference sources is set at a value about equal to or smaller than the pitch of pixels projected and enlarged on the screen from the displayed picture output by the picture display device.

In the screen according to second aspect of the present invention, an emission surface of the light passing plate is subjected to a reflection preventing process for preventing reflection of a visible light. As an alternative, on the emission side of the light passing plate, there can also be provided a reflection preventing film for preventing reflection of a visible light.

In the screen according to the second aspect of the present invention, a light scattering material is mixed inside the light passing plate. As an alternative, a light scattering layer can also be provided between the light passing plate and the first configuration element.

In the screen according to the second aspect of the present invention, a third configuration element having Fresnel lenses is provided on a light-incidence side of the first configuration element; the Fresnel lenses of the third configuration element are laid out at a lens pitch Fp; the openings of the first configuration element are laid out in a horizontal direction of the screen at a pitch Lp; a ratio Lp/Fp of the lens pitch Lp to the pitch Fp is set at a value in the range 1.588 to 1.649; a pitch Mp1 of moire lines caused by both interference sources is set at a value smaller than a pitch Iph of pixels projected and enlarged on the screen in a screen horizontal direction from the displayed picture output by the picture display device; and a pitch of interference lines caused by the both interference sources is set at a value about equal to or smaller than a pitch of pixels projected and enlarged on the screen from the displayed picture output by the picture display device.

According to a third aspect of the present invention, there is provided a projection-type picture display apparatus comprising:

a light source; a picture display device implemented as a matrix of pixels for modulating the intensity of a light generated by the light source; and a projection optical means for projecting a picture appearing on the picture display device. A Fresnel lens sheet placed on an emission side of the picture display device; a first configuration element having: lenticular lenses provided on an incidence side of a light passing through the Fresnel lens sheet; and light absorbing layers; and a second configuration element having a light passing plate fixed on the emission side of the first configuration element. The light absorbing layers are each provided at a place in close proximity to the focal point of one of the lenticular lenses and are separated from each other by a predetermined distance for forming the light passing unit; and a pitch of the light passing units is made smaller than a pitch of pixels projected and enlarged on a screen from the picture generated by the picture display device.

In a projection-type picture display apparatus according to the third aspect of the present invention, on an emission side of the light passing plate, there is provided a reflection preventing film for preventing reflection of a visible light.

In a projection-type picture display apparatus according to third aspect of the present invention, a light scattering material is mixed inside the light passing plate. As an alternative, a light scattering layer can also be provided between the light passing plate and the first configuration element.

In a projection-type picture display apparatus according to the third aspect of the present invention, Fresnel lenses of the Fresnel lens sheet are laid out at a pitch Fp; the light passing units are laid out in a horizontal direction of the screen at a pitch Lp; and a ratio Lp/Fp of the pitch Lp to the pitch Fp is set at a value in the range 1.588 to 1.649.

According to a fourth aspect of the present invention, there is provided a projection-type picture display apparatus comprising: a light source; a picture display device implemented as a matrix of pixels each having a means for modulating the intensity of a light generated by the light source; a projection optical means for projecting a displayed image appearing on the picture display device; and a screen used by the projection optical means to project the displayed image as an enlarge picture and provided with: a first configuration element having a plurality of lenticular lenses provided on a light-emission side of the projection optical means and light absorbing layers provided on a light-emission side of the first configuration element, and a light passing second configuration element provided on the light-emission side of the first configuration element. The lenticular lenses have a longitudinal direction coinciding with a screen surface vertical direction and are laid out contiguously in a screen surface horizontal direction; the light absorbing layers are sandwiched by boundaries of any two adjacent openings each provided at a location in close proximity to a focal point of one of the lenticular lenses associated with the opening; the first and second configuration elements are fixed to each other; a pitch of the openings is made smaller than a pitch of pixels projected and enlarged on the screen from the displayed image output by the picture display device; and a pitch of interference lines caused by both interference sources is set at a value about equal to or smaller than the pitch of pixels projected and enlarged on the screen from the displayed image output by the picture display device.

In the projection-type picture display apparatus according to the fourth aspect of the present invention, an emission surface of the second configuration element is subjected to a reflection preventing process for preventing reflection of a visible light.

In the projection-type picture display apparatus according to the fourth aspect of the present invention, a light scattering material is mixed inside the second configuration element. As an alternative, a light scattering layer is provided between the second configuration element and the first configuration element.

In the projection-type picture display apparatus according to the fourth aspect of the present invention, a third configuration element having Fresnel lenses is provided on a light-incidence side of the first configuration element; the Fresnel lenses of the third configuration element are laid out at a lens pitch Fp; the openings of the first configuration element are laid out in a horizontal direction of the screen at a pitch Lp; a ratio Lp/Fp of the lens pitch Lp to the pitch Fp is set at a value in the range 1.588 to 1.649; a pitch Mp1 of moire lines caused by both interference sources is set at a value smaller than a pitch Iph of pixels projected and enlarged on the screen in a screen horizontal direction from the displayed image output by the picture display device; and a pitch of interference lines caused by the both interference sources_is set at a value about equal to or smaller than a pitch of pixels projected and enlarged on the screen by the picture display device.

These and other objects, features and advantages of the present invention will be apparent from the following more particular description of preferred embodiments of the invention as illustrated in the accompanying drawings.

DESCRIPTION OF THE PREFERRED EMBODIMENTS

Some preferred embodiments of the present invention are described by referring to diagrams as follows.

Figure 1:
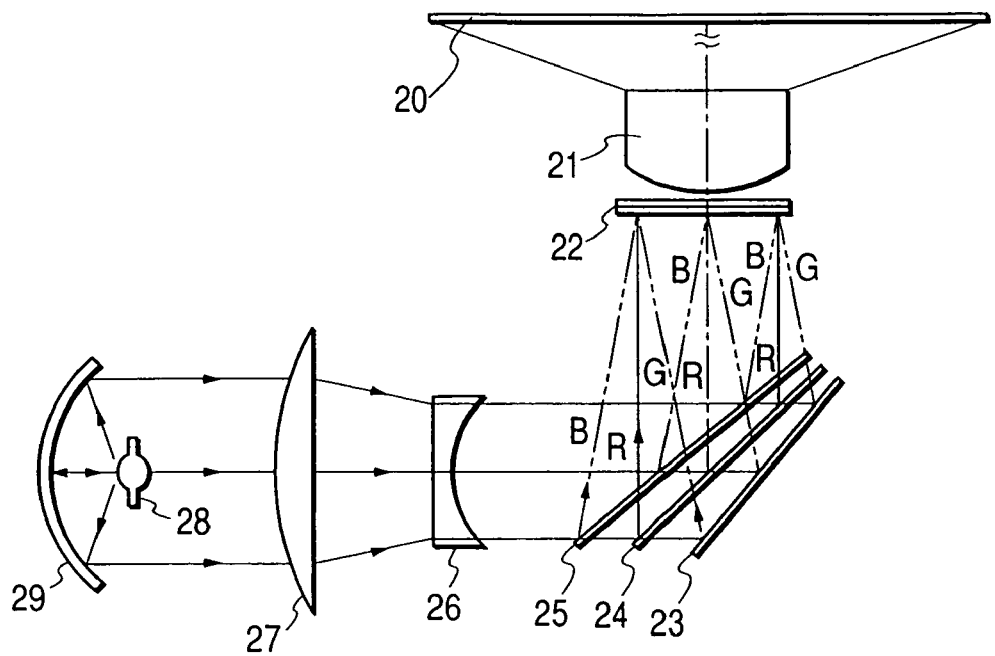
FIG. 1 is a top-view diagram showing a partial cross section of a layout of a projection-type optical system adopting the conventional single-panel technique employing one liquid-crystal panel.
Figure 2:
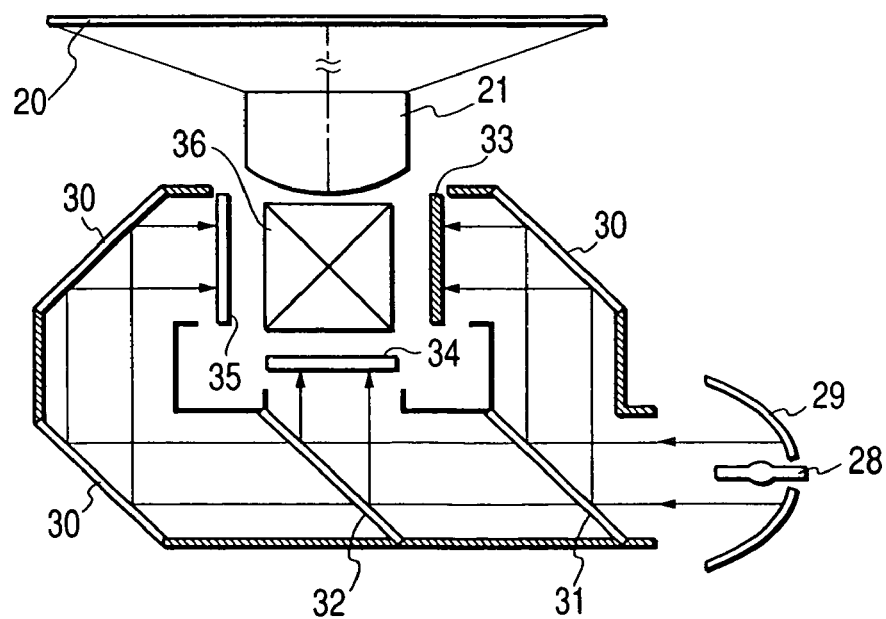
FIG. 2 is a top-view diagram showing a partial cross section of a layout of a projection-type optical system adopting the conventional three-panel technique employing three liquid-crystal panels.
Figure 3:
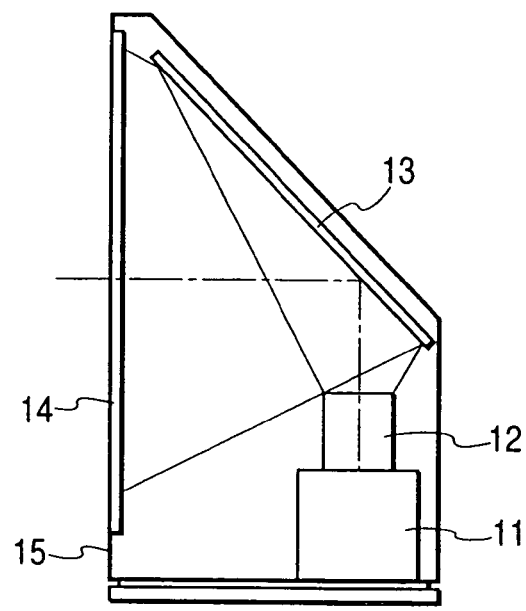
FIG. 3 is a side-view diagram showing a partial cross section of main components of a rear-projection-type picture display apparatus employing a projection-type optical system.
Figure 4:
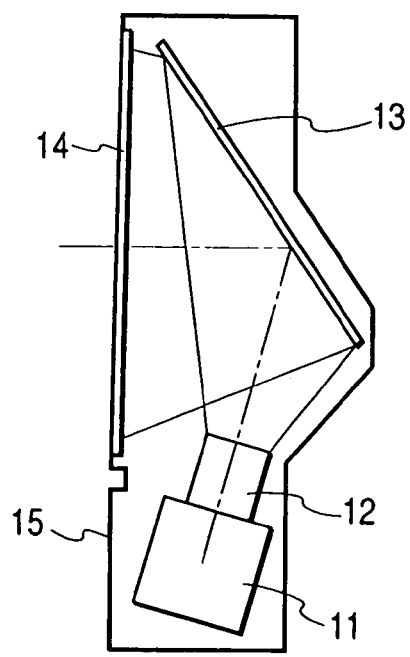
FIG. 4 is a side-view diagram showing a partial cross section of main components of another rear-projection-type picture display apparatus employing a projection-type optical system.
Figure 5:
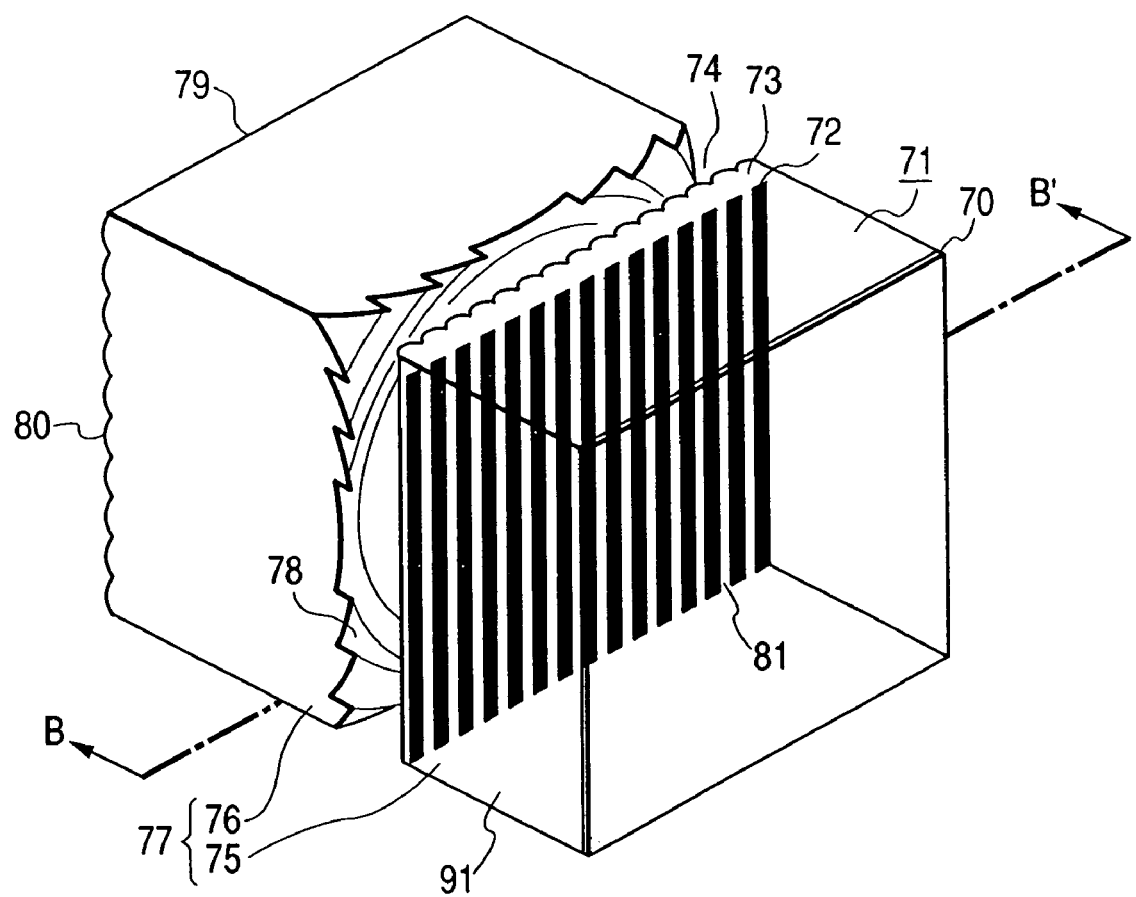
FIG. 5 is a diagram showing a squint view of main components employed in a screen implemented by a first embodiment of the present invention.

FIG. 5 is a diagram showing a squint view of main components employed in a screen implemented by a first embodiment of the present invention. In the figure, reference numerals 77 and 76 denote a screen and a Fresnel lens sheet (a third configuration element) respectively whereas reference numeral 75 denotes a lenticular lens sheet. The Fresnel lens sheet 76 and lenticular lens sheet 75 are joined to each other at their edges which are not shown in the figure. The basic materials of the Fresnel lens sheet 76 and lenticular lens sheet 75 are both an all but transparent thermoplastic resin material. Reference numeral 79 denotes the surface of incidence of an image light of the Fresnel lens sheet 76. The screen implemented by this embodiment has a shape wherein lenticular lenses 80 with the longitudinal direction thereof coinciding with the screen surface horizontal direction are laid out contiguously in the screen vertical direction. A Fresnel convex lens 78 is provided on the surface of emission of the image light. The Fresnel convex lens 78 is created by a compression formation technique. As an alternative, the Fresnel convex lens 78 can also be created at a much lower cost by stacking layers of UV resin on a thermoplastic resin base material. In addition, in the case of the Fresnel convex lens 78 made of UV resin, only one die serving as a master is required. Even if the pitch of the Fresnel convex lens 78 is made finer, there will be no increase in cost. Thus, practically, fine fabrication resulting in a pitch in the range 120 microns to 60 microns is possible. Reference numeral 74 denotes a lenticular lens provided on the incidence surface of a first configuration element 73 in a configuration wherein the lenticular lenses 74 with the longitudinal direction thereof coinciding with the screen surface vertical direction are laid out contiguously in the screen horizontal direction. A light passing window 81 for letting an image beam pass through is provided at a location in close proximity to the focus of each of the lenticular lenses 74. In addition, a light absorbing layer 72 is provided between any adjacent two of the light passing windows 81 to prevent the contrast performance from deteriorating due to an effect of an external light. In this embodiment, the lenticular lenses 74 are provided on the incidence surface of the first configuration element 73 whereas the light passing windows 81 and the light absorbing layers 72 are provided on the emission surface of the first configuration element 73. A second configuration element 71 is implemented by a light passing plate 91.

By the way, the optical-axis-direction thickness of the first configuration element 73 is about 1.5 times the lens pitch in the case of an elliptical lens shape. Even if a non-spherical surface is used and the focal point is shifted, the thickness is about 5 times the lens pitch. For this reason, if the lens pitch is reduced, the thickness is also decreased, resulting in a small strength. In order to solve this problem, in this embodiment, the first configuration element 73 is bound or stuck to the second configuration element 71 to give a strength that does not cause a problem in the practical use. It should be noted that, from the cost point of view, the second configuration element 71 is normally made of thermoplastic resin. In the case of a screen with a diagonal of 50 inches, a thickness of at least 1 inch gives a strength that does not cause a problem in the practical use. In this case, an air boundary surface between the first configuration element 73 and a second configuration element 71 disappears, allowing the reduction in contrast due to an unnecessary reflected light to be reduced. The screen can be made better by providing a reflection preventing film 70 on the observation-side surface of the second configuration element 71. In such a configuration, the degree of deterioration of the picture quality due to reflection of an external light can be lowered. For example, if for example a special low-reflection film made by NIPPON OIL AND FATS CO., LTD. (product name:ReaLook) is used as the reflection preventing film 70 bound or stick to the observation-side surface of the second configuration element 71, in the visible wavelength region, the reflectance is reduced to a value not exceeding 1%. As a result, it is possible to substantially lower the degree of deterioration of the picture quality due to inadvertent inclusion of an external light.

The embodiment implementing a screen provided by the present invention has been described so far. It should be noted that the surface of incidence of an image light of the Fresnel lens sheet 76 can be fabricated into a plane surface or a mat surface. As an alternative, the incidence surface can be subjected to another fabrication technique.

Figure 6:
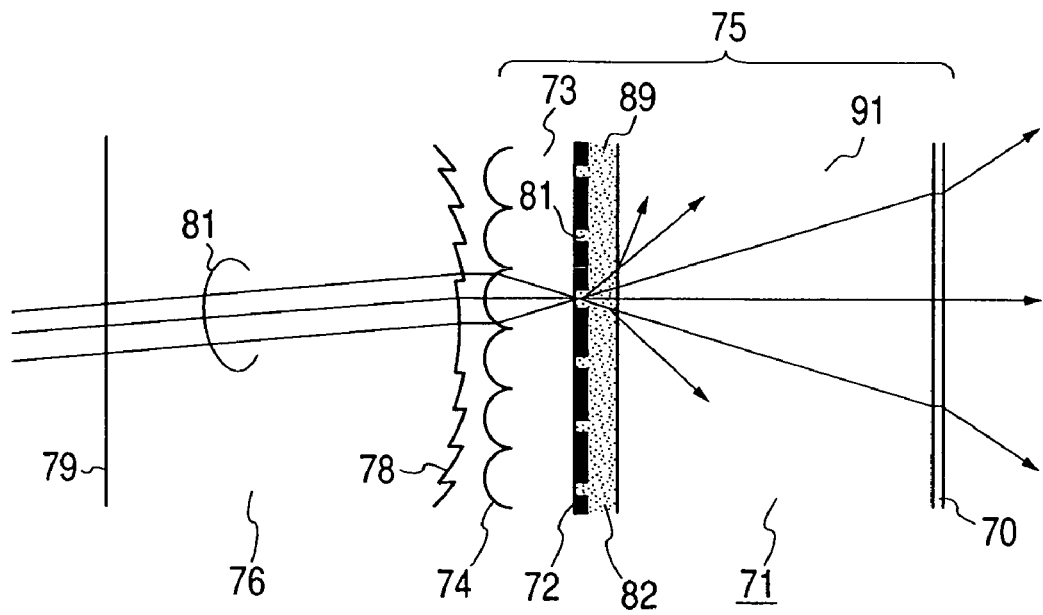
FIG. 6 is a diagram showing a squint view of a screen implemented by a second embodiment of the present invention which corresponds to a cross section B-B1 shown in FIG. 5.
Figure 7:
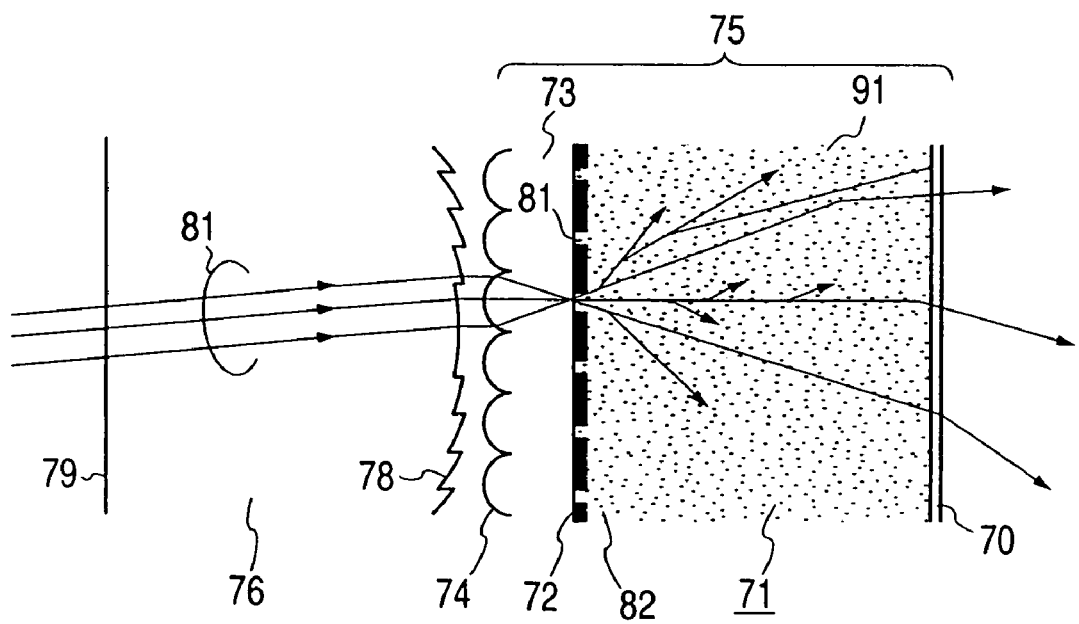
FIG. 7 is a diagram showing a squint view of a screen implemented by a third embodiment of the present invention which corresponds to the cross section B-B1 shown in FIG. 5.

FIG. 6 is a diagram showing a squint view of a screen implemented by a second embodiment of the present invention which corresponds to a cross section B-B1 shown in FIG. 5 and FIG. 7 is a diagram showing a squint view of a screen implemented by a third embodiment of the present invention which corresponds to the cross section B-B1. Components of the screens of FIGS. 5, 6 and 7 denoted by the same reference numeral are identical components.

In the screen shown in FIG. 6, an image light 81 entering the surface 79 on the image-source side (or the incidence surface 79) of the Fresnel lens sheet 76 is converted into all but parallel lights by the lens effect of the Fresnel convex lens 78. The parallel lights then hit the lenticular lens 74 provided on the incidence light of the lenticular lens sheet 75. Then, due to the lens effect of the lenticular lens 74, the lights pass through the light passing windows 81 instead of entering the light absorbing layers 72. A scattering layer 89 including a scattering material 82 is provided between the first configuration element 73 and the second configuration element 71. The scattering layer 89 is bound or stuck firmly to the first configuration element 73 and the second configuration element 71. The scattering layer 89 contributes to some of scattering of the image beam in the vertical and horizontal directions of the screen. The image beam scattered by the scattering layer 89 travels through the second configuration element 71 toward the observation side and then passes through the reflection preventing film 70 before being emitted to the observation side.

In the embodiment shown in FIG. 7, the scattering layer 89 shown in FIG. 6 is not employed. The embodiment shown in FIG. 7 has the same configuration as that of FIG. 6 except that a scattering material 82 is introduced in the second configuration element 71 over the entire surface of the light passing plate 91.

By configuring the screen 77 as described above, it is possible to substantially reduce the deterioration in picture quality due to inadvertent inclusion of an external light. In addition, even if the pitch of the lenticular lens 74 employed in the first configuration element 73 is reduced, the strength of the screen can be sustained at a sufficient value. The screen can thus adopt fine pitches. As a result, the possibility of the horizontal resolution's becoming poorer is lowered.

Next, a means for solving the moire problem is explained.

The following description explains a technology for reducing moires which are generated in a case where an optical device having a matrix structure is employed in the optical system of the projection-type picture display apparatus as a picture generating source. It is needless to say that the technology exhibits the same effect for other devices such as the digital micromirror device used as a picture generating source.

Figure 8:
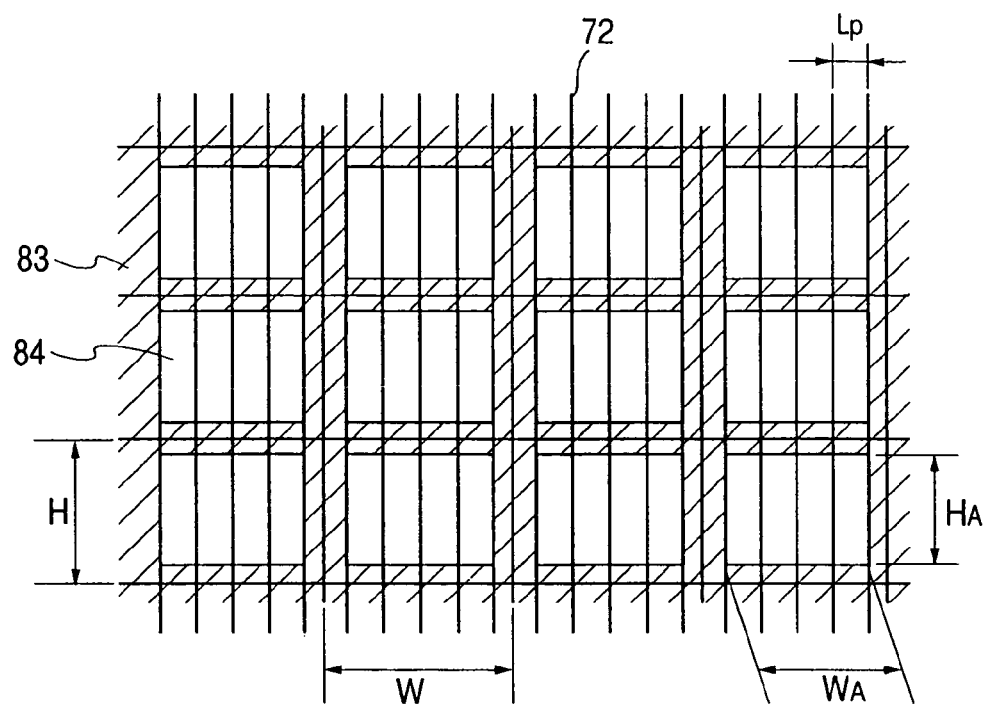
FIG. 8 is a diagram showing a top view of a lenticular-lens screen to explain a relation between enlarged pixels obtained as a result or projection and enlargement of a picture on a screen used in conjunction with a three-panel technique employing three liquid-crystal panels and the screen itself.

FIG. 8 is a diagram showing a top view of a lenticular-lens screen to explain a relation between enlarged pixels obtained as a result or projection and enlargement of a picture on the screen used in conjunction with a three-panel technique employing three liquid-crystal panels and the screen itself. In order to make the description simple, the explanation of the Fresnel lens is omitted.

In actuality, there is no case in which pixels on any one of the three liquid-crystal panels all overlap those on the other panels. Also in order to make the description simple, however, pixels on any one of the three liquid-crystal panels are assumed to all overlap those on the other panels.

Reference numeral 72 denotes a light absorbing layer provided on the first configuration element 73 employed in the lenticular sheet which is shown by a line. Reference numeral 83 denotes the liquid-crystal panel's light shielding area hatched with slanting lines. Reference numeral 84 denotes the liquid-crystal panel's pixel (an effective area) not hatched with slanting lines. The drawing as well as the explanation of the Fresnel lens are omitted.

The historical development of the screen is long. A technique to reduce moires generated by the Fresnel and lenticular lenses is disclosed in Japanese Examined Patent Publication No. Hei 3-72972. According to this conventional technique, the ratio of the pitch Lp of the lenticular lens to the pitch Fp of the Fresnel lens is set at the following value:

$Lp/Fp=N+\alpha$ where the symbol N denotes a natural number in the range 1 to 12 and the symbol a denotes a constant having a value in the range 0.35 to 0.43.

In addition, according to Japanese Examined Patent Publication No. Hei 5-63781, $Lp/Fp=5.525$ to $5.682$ or $6.472$ to $6.645$ Furthermore, in Japanese Examined Patent Publication No. Hei 7-117818, the following ratio is disclosed:

$Lp/Fp=N+0.5$ where the symbol N is a natural number.

However, these technologies are developed for a case in which a Braun tube is used as a picture displaying source. For an optical device having a structure comprising pixels laid out to form a matrix, none are disclosed.

In the embodiment shown in FIG. 8, the vertical and horizontal dimensions of a liquid-crystal pixel are denoted by notations H and W respectively whereas the vertical and horizontal dimensions of an effective area of the liquid-crystal pixel are denoted by notations HA and WA respectively. Let Iph and Ipv denote the pixel pitch in the horizontal direction and the pixel pitch in the vertical direction respectively whereas Fp and Lp respectively denote the pitch of the Fresnel lens 76 shown in FIGS. 6 and 7 and the pitch of the light absorbing layer 72, that is the light passing window 81 provided on the first configuration element 73 employed in the lenticular lens sheet 75 as shown in FIGS. 6 and 7. A moire pitch caused by the pitch Lp of the light absorbing layer 72 and the pitch Fp of the Fresnel lens 78 is denoted by notation Mp1 or, to be more specific, Mp1h in the horizontal direction and Mp1v in the vertical direction. On the other hand, a moire pitch caused by the pitch Lp and the pitch Ip (with the pitches Iph and Ipv in horizontal and vertical directions respectively taken into consideration) of an enlarged pixel is denoted by notation Mp2 or, to be more specific, Mp2h in the horizontal direction and Mp2v in the vertical direction. A moire pitch caused by the pitches Mp1 and Ip is denoted by notation Mp3 or, to be more specific, Mp3h in the horizontal direction and Mp3v in the vertical direction. First of all, a range with few generated moires was found by computation. In the case of the actual apparatus, an optimum condition was found with a projection size or the projection magnification of the pixel used as a parameter on the basis of a Fresnel lens sheet with a fine pitch and a lenticular sheet with a fine pitch which can be obtained at the present point of time, and a prototype was then built for verification purposes.

A moire frequency Fm (k, 1) expressed in terms of cycles/mm was computed by using the following approximation formula.

$Fm(k, 1)=k/Fp-1/Lp$ where notation k denotes the Fresnel harmonic order.

In this case, a positive polarity of Fm indicates generated elliptical moires whereas a negative polarity of Fm indicates generated hyperbolic moires.

Data of an optical system completing a verification experiment is given as follows.

TABLE 1

| (Item) | (Performance) |
|---|---|
| Lenticular lens sheet | Pitch 0.155 mm |
| Fresnel lens sheet | Parameter |
| Conjugate point (52.5-inch projection) | 690 mm |
| (40.3-inch projection) | 530 mm |
| Projected-pixel horizontal-direction pitch: (52.5-inch projection) | 1.334 mm |
| Projected-pixel horizontal-direction pitch: (40.3-inch projection) | 1.024 mm |
| Projected-pixel vertical-direction pitch: (52.5-inch projection) | 1.0005 mm |
| Projected-pixel vertical-direction pitch: (40.3-inch projection) | 0.768 mm |
| Pixel count (dot) 800 (horizontal) | 600 (vertical) |
| Projection lens F value | 1.5 |
| Half picture angle 44 degrees | |

Moires generated in the horizontal direction were calculated and evaluated for a 40.3-inch projection. The moire pitch Mp1h caused by the pitch Lp of the light absorbing layer 72 and the pitch Fp of the Fresnel lens 78 was changed over the range 1.55 to 1.65 with the pitch Fp of the Fresnel lens 78 taken as a parameter and evaluation was made at intervals of 0.025. The results of the calculation and the evaluation set the moire pitch Mp3h caused by the pitch Mp1h and the pixel Iph in the horizontal direction at a value of about 1.02 mm for a 40.3-inch projection. The value of 1.02 mm is about equal to the pixel pitch Iph in the horizontal direction on the screen. This combination was verified by using an actual machine to find out that almost no moires were generated to cause a problem in the practical use such as substantial deterioration of the picture quality. At that time, if the moire pitch Mp1h caused by the pitch Lp of the light absorbing layer 72 and the pitch Fp of the Fresnel lens 78 had a value in the range 1.575 to 1.625, the fact that a good performance was obtained was confirmed by using the actual machine. At that time, values of the Fresnel pitch were 0.0984 mm, 0.0969 mm and 0.0954 mm. In addition, since the ratio (Ipv/Fp) of the pixel pitch Ipv in the vertical direction to the pitch Fp of the Fresnel lens is close to 4, almost no moires were recognized by virtue of an optical scattering effect of the scattering layer 89 employed in the lenticular lens sheet 75.

By the same token, moires generated in the horizontal direction were calculated and evaluated for a 52.5-inch projection. The moire pitch Mp1h caused by the pitch Lp of the light absorbing layer 72 and the pitch Fp of the Fresnel lens 78 was changed, being set at values of 1.55, 1.558, 1.600 and 1.649 with the pitch Fp of the Fresnel lens 78 taken as a parameter, and evaluation was made. The results of the calculation and the evaluation set the moire pitch Mp3h caused by the pitch Mp1h and the pixel Iph in the horizontal direction at a value of about 1.334 mm for a 52.5-inch projection. The value of 1.334 mm is about equal to the pixel pitch Iph in the horizontal direction on the screen. This combination was verified by using an actual machine to find out that almost no moires were generated to cause a problem in the practical use such as substantial deterioration of the picture quality. At that time, if the moire pitch Mp1h caused by the pitch Lp of the light absorbing layer 72 and the pitch Fp of the Fresnel lens 78 had a value in the range 1.558 to 1.649, the fact that a good performance was obtained was confirmed by using the actual machine. At that time, the Fresnel pitch was 0.0995 mm, 0.0969 mm and 0.0940 mm. In addition, since the ratio (Ipv/Fp) of the pixel pitch Ipv in the vertical direction to the pitch Fp of the Fresnel lens is close to 4, almost no moires were recognized by virtue of an optical scattering effect of the scattering layer 89 (the second configuration element 71 with the scattering material 82 mixed therein) employed in the lenticular lens sheet 75.

As described above, it is necessary to reduce moires generated by the horizontal-direction component Iph and the vertical-direction component Ipv of the pitch Ip of enlarged pixels, the pitch of the lenticular lens 74 and the pitch Fp of the Fresnel lens 78. This is because such moires cause the picture quality to deteriorate substantially over the entire projection area of the screen when a source picture appearing on a device comprising pixels laid out to form a matrix is projected on the screen as an enlarged picture by using a projection lens. In order to reduce such moires it is thus necessary to set the ratio (Lp/Fp) of the pitch Lp of the light absorbing layer 72 provided on the first configuration element 73 employed in the lenticular lens sheet 75 to the pitch Fp of the Fresnel lens 78 at a value of about 1.6, as well as to set the moire pitch Mp1 caused by the pitches Lp and Fp at a value about equal to the horizontal component Iph of the pitch Ip. In addition, it also necessary to set the ratio (Ipv/Fp) the vertical-direction component Ipv of the of the pixel pitch Ip of enlarged pixels to the pitch Fp of the Fresnel lens at a value of at least two.

Then, the same evaluation was made with the pitch of the Fresnel lens 78 set at 60 microns to verify by using an actual machine that a more excellent performance not recognizing moires of even higher orders could be obtained.

The above description explains a case in which a picture is projected and enlarged on a screen by using an optical device adopting the three-panel technique utilizing three liquid-crystal panels. In the case of a single-panel system using only one liquid-crystal panel like the one shown in FIG. 9, it has been confirmed by using an actual machine that a pixel-trio pitch can be treated to be the same as the pixel pitch of the three-panel technique described above. The pixel-trio pitch is a pitch with 3 pixels treated as a set.

Figure 9:
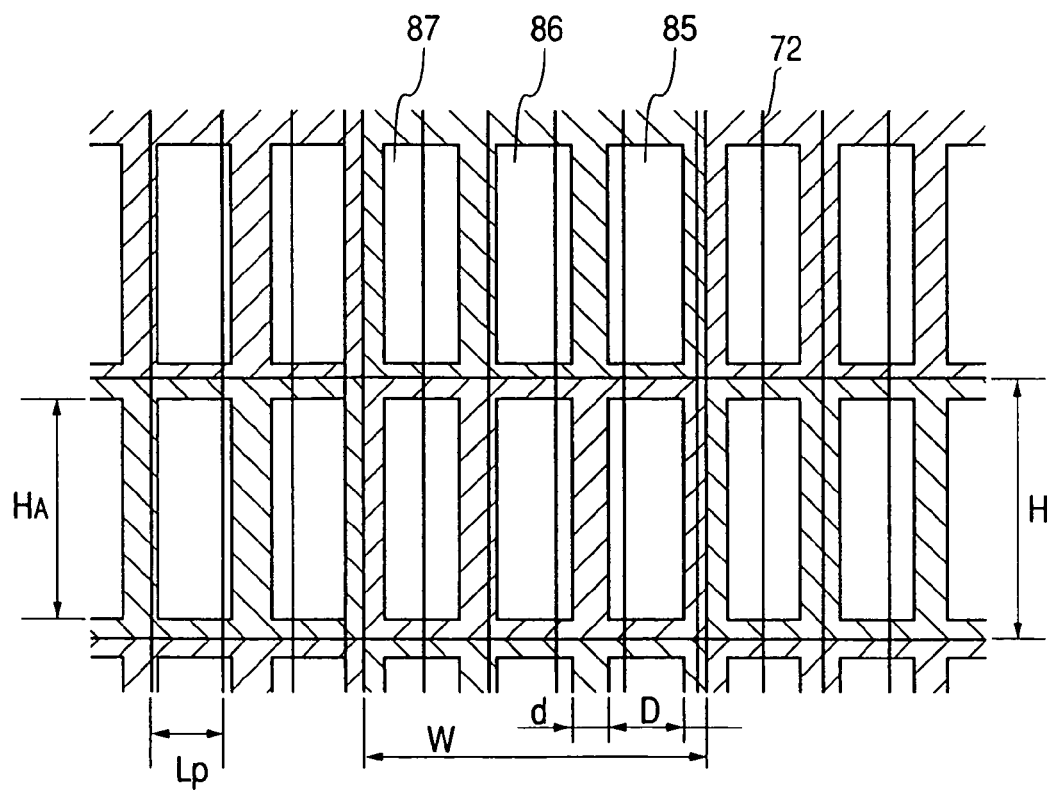
FIG. 9 is a diagram showing a top view of a lenticular-lens screen to explain a relation between enlarged pixels obtained as a result or projection and enlargement of a picture on the screen used in conjunction with a single panel technique employing one liquid-crystal panel and the screen itself.
Figure 10:
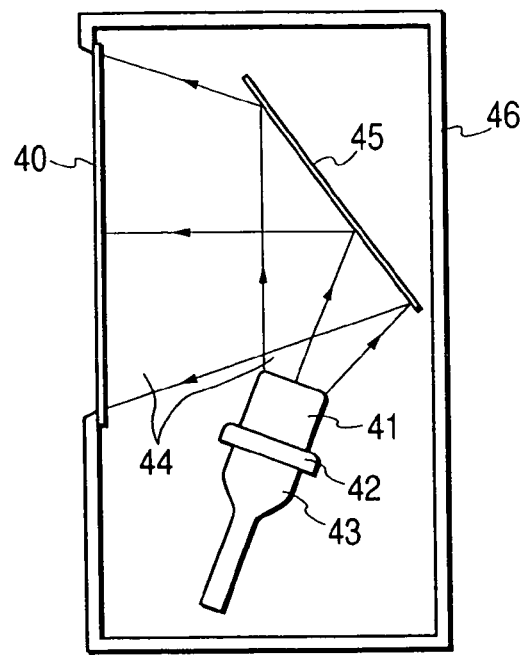
FIG. 10 is a side-view diagram showing a partial cross section of main components of a rear-projection-type picture display apparatus employing a projection-type Braun tube.
Figure 11:
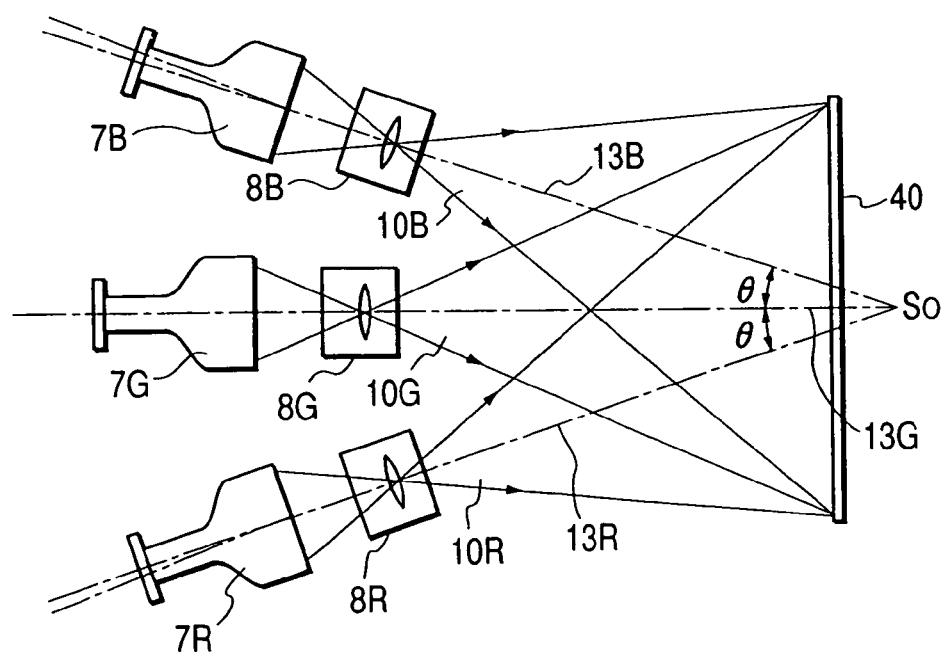
FIG. 11 is a diagram showing a top view of a layout of the rear-projection-type picture display apparatus employing a projection-type Braun tube on a horizontal plane in a simple and plain manner.
Figure 12:
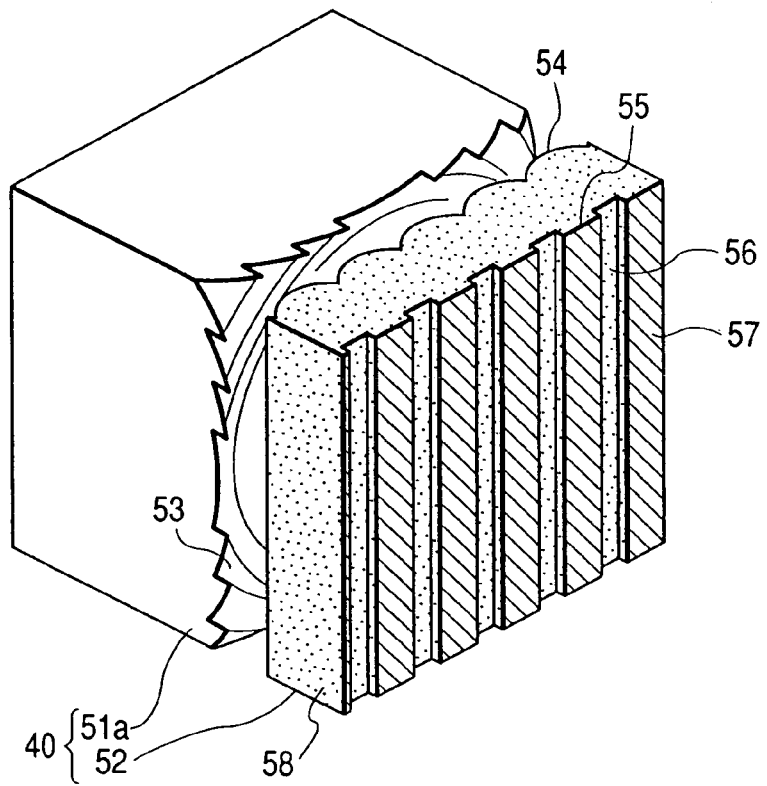
FIG. 12 is a diagram showing a squint view of main components of a conventional screen.
Figure 13:
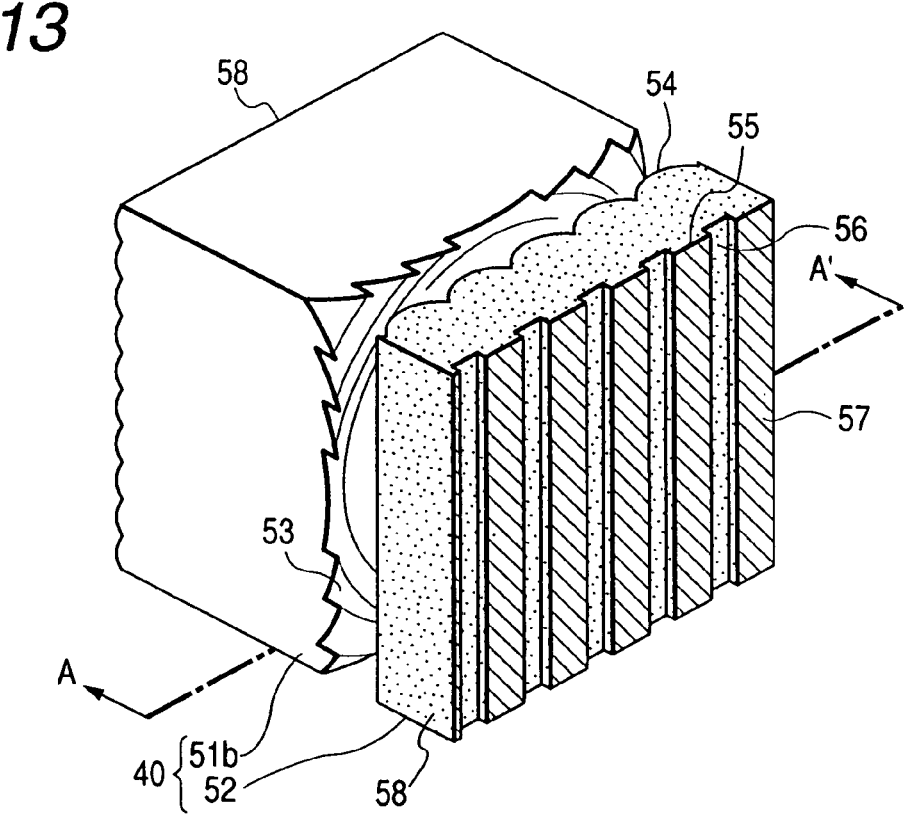
FIG. 13 is a diagram showing a squint view of main components of another conventional screen.
Figure 14:
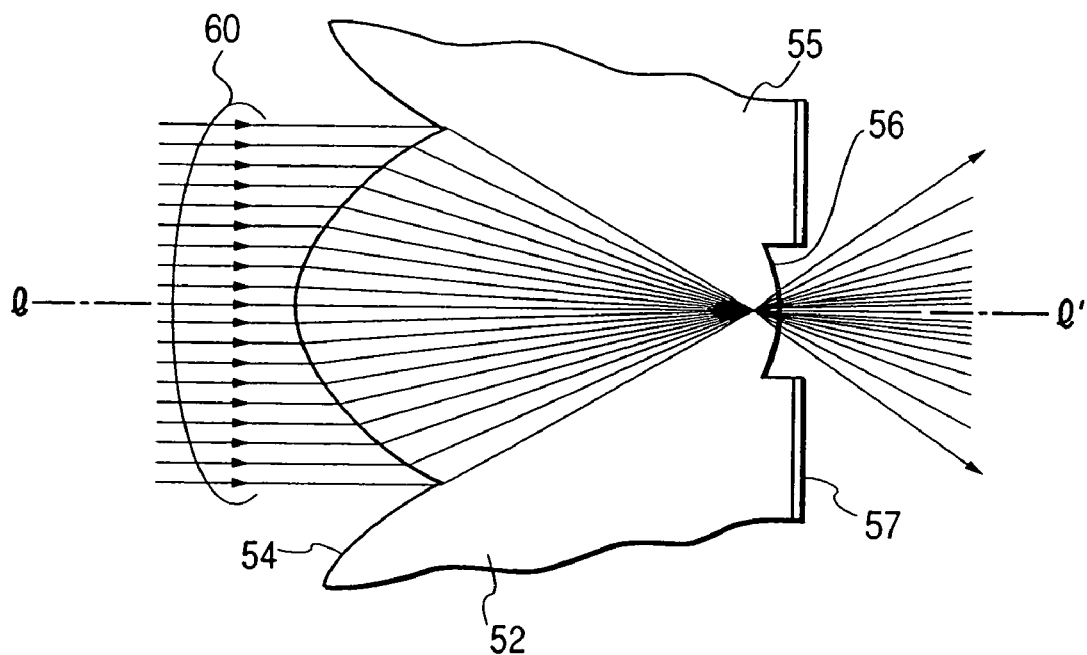
FIG. 14 is a diagram showing a partial enlarged cross section of a lenticular lens cut in a direction A-A1 shown in FIG. 13.
Figure 15:
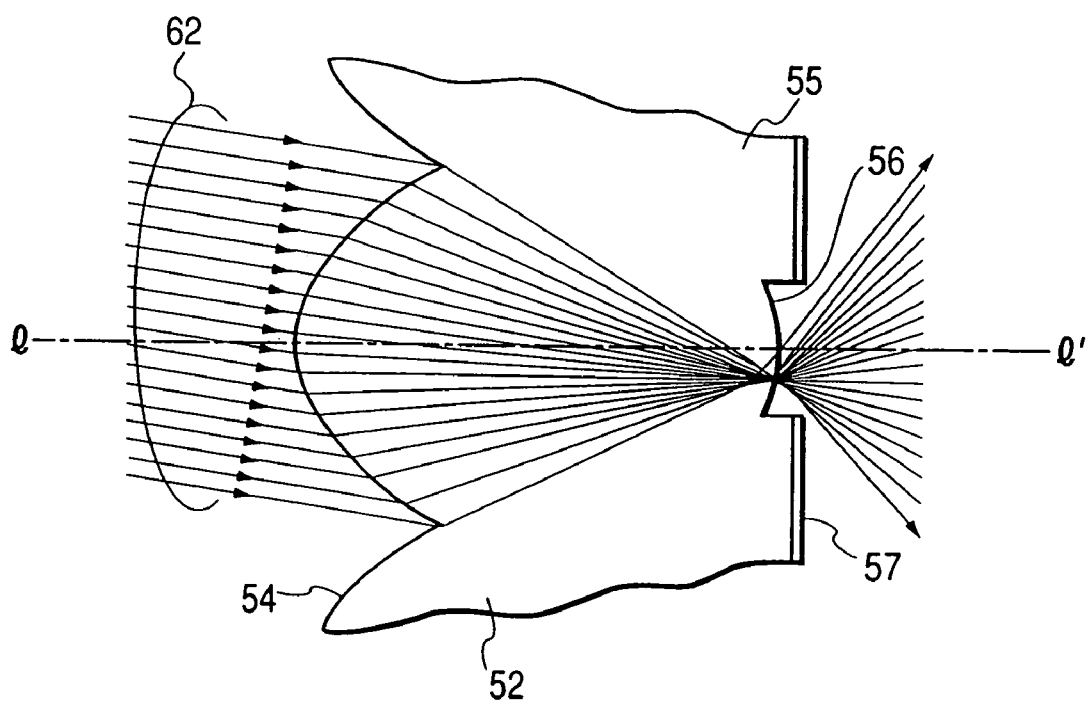
FIG. 15 is a diagram showing a partial enlarged cross section of a lenticular lens cut in a direction A-A1 shown in FIG. 13.

FIG. 9 is a diagram showing a top view of a lenticular-lens screen to explain a relation between enlarged pixels obtained as a result or projection and enlargement of a picture on the screen used in conjunction with a single panel technique employing one liquid-crystal panel and the screen itself. In the figure, reference numeral 72 denotes a light absorbing layer whereas reference numerals 85, 86 and 87 each denote a pixel. The symbol d denotes the width of a blocked-light area of the liquid-crystal panel and the symbol D denotes the width of an effective area of the liquid-crystal panel.

By employing a screen with a configuration described above in a projection-type picture display apparatus for projecting an image appearing on an optical device such as a liquid-crystal panel or a DMD (Digital Micromirror Device) with a structure comprising pixels laid out to form a matrix on the screen as an enlarged picture by using a projection lens, inadvertent inclusion of an external light can be reduced so that the contrast deterioration can be decreased and, at the same time, the resolution degradation can be made smaller while the deterioration of the picture quality can also be lessened so that, as a result, it is possible to implement a good performance.

The present invention may be embodied in other specific forms without departing from the spirit or essential characteristics thereof. The present embodiments are therefore to be considered in all respects as illustrative and not restrictive. That is, the scope of the present invention is indicated by the appended claims rather than by the foregoing description. In addition, all changes which come within the meaning and range of equivalency of the claims are therefore intended to be embraced therein.

What is claimed is:

1. A screen for use in a projection-type image display apparatus having an image displaying element which includes a plurality of pixels for modulating a light from a light source so as to form an image formed by said image displaying element to be projected on said screen as an enlarged picture, said screen comprising:

a Fresnel lens sheet forming Fresnel lenses on a light emission side thereof;

a first sheet disposed on the light emission side of said Fresnel lens sheet; and a second sheet disposed on a light emission side of said first sheet and being adhered on a light emission surface of said first sheet;

wherein said first sheet includes a plurality of lenticular lenses formed on a light incident side thereof, said lenticular lenses extending in a longitudinal direction and being arranged in a horizontal direction, light passing window portions formed at positions opposing to said lenticular lenses with light absorbing portions provided between said light passing window portions;

wherein said second sheet includes a light scattering element therein, and wherein the following equations are satisfied:

$1.558 \leq Lp/Fp \leq 1.649;$ $Lp < Iph;$ and $Ipv/Fp \geq 2;$ where Fp is a pitch between the Fresnel lenses formed on said Fresnel lens sheet, Lp is a pitch of the light absorbing portions provided on said first sheet, Iph is a pixel pitch of said image display element which is projected so as to form an enlarged picture on said screen in a horizontal direction, and Ipv is a pixel pitch thereof in a vertical direction.

2. The screen according to claim 1, wherein said Fresnel lens sheet has a light incident surface provided with a mat surface.

3. The screen according to claim 1, wherein Mp1h and Iph satisfy following condition:

$Mp1h \leq Iph;$ where Mp1h is a pitch of moire in the horizontal direction, which is determined by said Lp and Fp.

4. The screen, as described in claim 1, wherein a reflection preventing film is provided on a light emission side surface of said second sheet.

5. A screen for use in a projection-type image display apparatus having an image displaying element, which includes a plurality of pixels for modulating a light from a light source so as to form an image formed by said image displaying element to be projected on said screen as an enlarged picture, said screen comprising:

a Fresnel sheet forming Fresnel lenses on a light emission side thereof; and another sheet which is disposed on the light emission side of said Fresnel lens sheet and has plural numbers of lenticular lenses which are formed on a light incident side thereof so as to extend in a longitudinal direction and being arranged in a horizontal direction;

wherein said second sheet includes light passing window portions formed at positions opposing to said lenticular lenses with light absorbing portions being provided therebetween;

wherein said another sheet includes a light scattering element therein; and wherein following equations are satisfied;

$1.558 \leq Lp/Fp \leq 1.649;$ $Lp < Iph;$ and $Ipv/Fp \geq 2;$ where Fp is a pitch between the Fresnel lenses formed on said Fresnel sheet, Lp is a pitch of the light absorbing portion provided on said another sheet, Iph is a pixel pitch of said image display element which is projected so as to form an enlarged picture on said screen in a horizontal direction, and Ipv is a pixel pitch thereof in a vertical direction.

6. The screen according to claim 5, wherein said Fresnel sheet has a light incident surface provided with a mat surface.

7. The screen according to claim 5, wherein said another sheet includes a first member having said lenticular lenses, said light passing window portions and said light absorbing portions, and a second member which is adhered on said first member.

8. A screen for displaying an enlarged and projected display image from an image display device having pixels laid out in a matrix form, the screen comprising:

a Fresnel lens sheet having Fresnel lenses formed at a light emission side thereof; and a lenticular lens sheet which is located at the light emission side of the Fresnel lens sheet;

wherein the lenticular lens sheet includes, a plurality of lenticular lenses which are arranged at a light incidence side thereof in a horizontal direction of the screen, the lenticular lenses extending in vertical direction of the screen, a plurality of light passing portions which are provided at positions opposed to each of the lenticular lenses, and a plurality of light absorbing portions, one of the light absorbing portions being provided between the light passing portions; and wherein the light absorbing portions are arranged so that the following equation is satisfied $1.558 \leq Lp/Fp \leq 1.649;$ where Fp is a pitch between the Fresnel lenses formed on the Fresnel lens sheet, and Lp is a pitch of the light absorbing portions provided on the lenticular lens sheet.

9. The screen according to claim 8, wherein the lenticular lens sheet contains light scattering materials.

10. The screen according to claim 8, wherein the lenticular lens sheet includes a first sheet provided with the lenticular lenses, the light passing portions and the light absorbing portions, and a second sheet located at a light emission side of the first sheet, the second sheet containing light scattering materials.

11. The screen according to claim 10, wherein the first sheet is connected with the second sheet.

12. The screen according to claim 11, wherein the second sheet has an antireflection film provided at a light emission side thereof.

13. The screen according to claim 8, wherein the light absorbing portions and the Fresnel lens are arranged so the following equations are satisfied:

$Lp < Iph;$ and $Fp/Ipv > 2;$ where Iph is an enlarged and projected pixel pitch of the image display device on the screen in a horizontal direction, and Ipv is a pixel pitch of the image display device in a vertical direction.

14. A lenticular lens sheet for use in a screen for displaying an enlarged and projected display image from an image display device having pixels laid out in a matrix form, the screen including a Fresnel lens sheet having Fresnel lenses, the lenticular lens sheet comprising:

a plurality of lenticular lenses which are arranged at a light incidence side in a horizontal direction of the screen, the lenticular lenses extending in vertical direction of the screen;

a plurality of light passing portions which are provided at positions opposed to each of the lenticular lenses; and a plurality of light absorbing portions, one of the light absorbing portions being provided between the light passing portions;

wherein the light absorbing portions are arranged so that the following equations are satisfied $1.558 \leq Lp/Fp < 1.649$; and $Lp < Iph$;

wherein Fp is a pitch between the Fresnel lenses formed on the Fresnel lens sheet, Lp is a pitch of the light absorbing portions provided on the lenticular lens sheet, and Iph is an enlarged and projected pixel pitch of the image display device on the screen in a horizontal direction.

15. The lenticular lens sheet according to claim 14, wherein the lenticular lens sheet contains light scattering materials.

16. The lenticular lens sheet according to claim 14, wherein the lenticular lens sheet includes a first sheet provided with the lenticular lenses, the light passing portions and the light absorbing portions, and a second sheet located at a light emission side of the first sheet, the second sheet containing light scattering materials.

17. The lenticular lens sheet according to claim 16, wherein the first sheet is connected with the second sheet.

18. The lenticular lens sheet according to claim 17, wherein the second sheet has an antireflection film provided at a light emission side thereof.

19. A lenticular lens sheet for use in a screen for displaying an enlarged and projected display image from an image display device having pixels laid out in a matrix form, the screen including a Fresnel lens sheet having Fresnel lenses, the lenticular lens sheet comprising:
  a plurality of lenticular lenses which are arranged at a light incidence side in a horizontal direction of the screen, the lenticular lenses extending in vertical direction of the screen;
  a plurality of light passing portions which are provided at positions opposed to each of the lenticular lenses; and
  a plurality of light absorbing portions, one of the light absorbing portions being provided between the light passing portions;
  wherein the light absorbing portions are arranged so that a following equation is satisfied $1.558 \leq Lp/Fp \leq 1.649$;

wherein Fp is a pitch between the Fresnel lenses formed on the Fresnel lens sheet, and Lp is a pitch of the light absorbing portions provided on the lenticular lens sheet.

20. The lenticular lens sheet according to claim 19, wherein the lenticular lens sheet contains light scattering materials.

21. The lenticular lens sheet according to claim 19, wherein the lenticular lens sheet includes a first sheet provided with the lenticular lenses, the light passing portions and the light absorbing portions, and a second sheet located at a light emission side of the first sheet, the second sheet containing light scattering materials.

22. The lenticular lens sheet according to claim 21, wherein the first sheet is connected with the second sheet.

23. The lenticular sheet according to claim 22, wherein the second sheet has an antireflection film provided at a light emission side thereof.

24. A Fresnel lens sheet for use in a screen for displaying an enlarged and projected display image from an image display device having pixels laid out in a matrix form, the screen including a lenticular lens sheet having light absorbing portions, the Fresnel lens sheet comprising:
  a light incidence surface provided at a light incidence side thereof; and
  Fresnel lenses provided at a light emission side thereof which convert incidence light from the light incidence surface into substantially parallel light;
  wherein the Fresnel lenses are arranged so as that the following equations are satisfied $1.558 \leq Lp/Fp \leq 1.649$; and $Fp/Ipv > 2$ where Fp is a pitch between the Fresnel lenses formed on the Fresnel lens sheet, Lp is a pitch of light absorbing portions provided on the lenticular lens sheet, and Ipv is an enlarged and projected pixel pitch of the image display device on the screen in a vertical direction.

25. A Fresnel lens sheet for use in a screen for displaying an enlarged and projected display image from an image display device having pixels laid out in matrix form, the screen including a lenticular lens sheet having light absorbing portions, the Fresnel lens sheet comprising:
  a light incidence surface provided at a light incidence side thereof; and
  Fresnel lenses provided at a light emission side thereof which convert incidence light from the light incidence surface into substantially parallel light;
  wherein the Fresnel lenses are arranged so that a following equation is satisfied $1.558 \leq Lp/Fp \leq 1.649$;

where Fp is a pitch between the Fresnel lenses formed on the Fresnel lens sheet, and Lp is a pitch of light absorbing portions provided on the lenticular lens sheet.

* * * * *